United States Patent [19]

Nishino et al.

[11] Patent Number: 5,262,853

[45] Date of Patent: Nov. 16, 1993

[54] VIDEO SIGNAL ENCODER CAPABLE OF ENCODING VIDEO SIGNAL DATA OF VIDEO SIGNALS HAVING BOTH CONVENTIONAL AND GREATER ASPECT RATIOS WHILE MAINTAINING TRANSFORMATION BLOCK AT A CONSTANT LENGTH

[75] Inventors: Masakazu Nishino, Kashiwara; Tatsuro Juri, Osaka; Hideki Ohtaka, Neyagawa, all of Japan

[73] Assignee: Matsushita Electric Industrial Co., Ltd., Osaka, Japan

[21] Appl. No.: 831,993

[22] Filed: Feb. 6, 1992

[30] Foreign Application Priority Data

Feb. 6, 1991 [JP] Japan .................... 3-15191

[51] Int. Cl.$^5$ .......................... H04N 7/12; H04N 7/04
[52] U.S. Cl. ..................... 358/133; 358/141
[58] Field of Search .......... 358/133, 141, 140, 135, 358/136

[56] References Cited

U.S. PATENT DOCUMENTS

| | | |
|---|---|---|
| 4,885,637 | 12/1989 | Shikakura et al. ............. 358/141 |
| 5,006,931 | 4/1991 | Shirota ........................ 358/133 |
| 5,010,405 | 4/1991 | Schreiber et al. ............. 358/141 |
| 5,014,116 | 5/1991 | Kawai .......................... 358/141 |
| 5,047,852 | 9/1991 | Hanyu et al. ................. 358/133 |
| 5,073,821 | 12/1991 | Juri ............................ 358/133 |
| 5,121,205 | 6/1992 | Ng et al. ..................... 358/141 |
| 5,122,875 | 6/1992 | Raychaudhuri et al. ....... 358/133 |
| 5,126,842 | 6/1992 | Andrews et al. ............. 358/133 |
| 5,148,271 | 9/1992 | Kato et al. ................... 358/133 |
| 5,150,208 | 9/1992 | Otaka et al. ................. 358/133 |

*Primary Examiner*—James J. Groody
*Assistant Examiner*—John W. Miller
*Attorney, Agent, or Firm*—Wenderoth, Lind & Ponack

[57] ABSTRACT

In an encoder for selectively receiving, blocking and coding by orthogonal transformation an image A with a screen aspect ratio which is greater than 4:3 or an image B with a screen aspect ratio of 4:3, when the image A is entered, it is divided into a basic screen with an aspect ratio of 4:3 corresponding to a central portion of a screen and an additional screen other than the basic screen. Coding is controlled so that a sum of coded data quantity of a specified number of blocks m of orthogonal transformation of the basic screen and a specified number of blocks n of orthogonal transformation of the additional screen is within a specified data quantity x. When the image B is entered, the coding is controlled so that a coded data quantity of the same number of blocks of orthogonal transformation as the specified number of blocks of orthogonal transformation m of the basic screen of the image A is within the same data quantity as the specified data quantity x.

2 Claims, 4 Drawing Sheets (a), (b)

(d)

(f)

(h)

VIDEO SIGNAL ENCODER CAPABLE OF ENCODING VIDEO SIGNAL DATA OF VIDEO SIGNALS HAVING BOTH CONVENTIONAL AND GREATER ASPECT RATIOS WHILE MAINTAINING TRANSFORMATION BLOCK AT A CONSTANT LENGTH

BACKGROUND OF THE INVENTION

1. Field of the Invention

The present invention relates to a high-efficiency encoder for encoding a video signal with a screen aspect ratio of 4:3 and a video signal with an aspect ratio which is greater than 4:3 (for example, 16:9).

2. Description of the Prior Art

Generally, a video signal including extremely large quantity of information, and in recording or transmitting the signal, the quantity of information is reduced by high-efficiency coding (bit rate reduction coding) so that picture quality deterioration may not be visually obvious. For example, an input video signal is blocked and transformed orthogonally, and coded by quantizing or variable length coding so that the coded data quantity may be constant (the constant coding data quantity being x) in every specified number of orthogonal transformation blocks (assume m blocks).

Such conventional constitution, however, is not sufficiently flexible enough to be capable of encoding signals with different aspect ratios such as, for example, a signal with an aspect ratio of 4:3 and a signal with the aspect ratio of 16:9. Usually, the signal with the aspect ratio of 16:9 is wider in frequency band width than the signal with the aspect ratio of 4:3, and hence the input data quantity is greater. Therefore, in the conventional constitution, when a signals with an aspect ratio 16:9 and a signal with the aspect ratio 4:3 are both controlled and coded so that the orthogonal transformation data of m blocks may be the constant coding data quantity x, the coding data quantity per unit time differs between the two type signals.

SUMMARY OF THE INVENTION

It is hence a primary object of the invention to present, in the light of the above problems of the prior art, a video signal encoder capable of coping with both an aspect ratio of 4:3 and a greater aspect ratio (for example, 16:9), and equalizing the coding data quantity per unit time of both signals.

To achieve the above object, the invention presents a video signal encoder for selectively receiving an image A with a screen aspect ratio which is larger than 4:3 and an image B with a screen aspect ratio of 4:3, and for blocking and coding by an orthogonal transformation, comprising means for dividing an image A into a basic screen with the aspect ratio of 4:3 corresponding to a central portion of a screen: a and an additional screen other than the basic screen, control means for controlling the coding so that a sum of a coded data quantity of a specified number of orthogonal transformation blocks of the basic screen and a coded data quantity of another specified number of orthogonal transformation blocks n of the additional screen is within a specified data quantity when the image A is entered, and for controlling the coding so that a coded data quantity of the same number of orthogonal transformation blocks o the image B as the specified number of the orthogonal transformation blocks of the basic screen of the image A is within the same data quantity as the specified data quantity when the image B is entered, and a coding means for coding orthogonal transformation data of the image A or image B depending on the control means.

In this constitution, the specific coded data quantity contains the coded data of the basic screen of exactly the same input data quantity as the image B with the screen aspect ratio of 4:3 and the coded data of the additional screen other than the basic screen, in the coded data of the image A. Still more, the number of orthogonal transformation blocks of the basic screen contained in the specific coding data quantity is exactly the same number of blocks in the case of the image B. Hence, even if the image A which has a greater input data quantity than that of the image B is entered, the coded data quantity per unit time is exactly the same.

DESCRIPTION OF THE PREFERRED EMBODIMENTS

Figure 1:
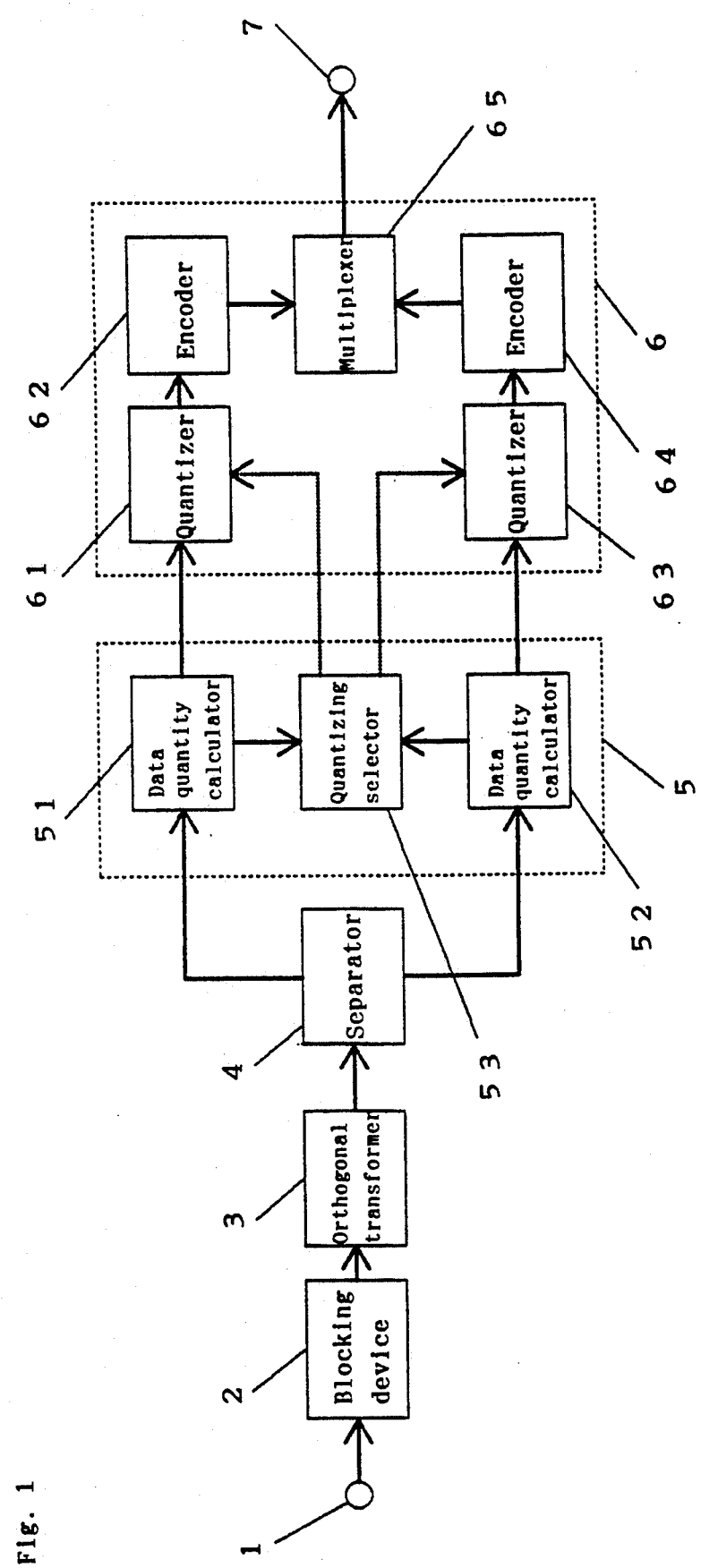
FIG. 1 is a diagram showing a constitution of a video signal encoder in accordance with an embodiment of the present invention.

FIG. 1 is a diagram showing a constitution of an encoder in accordance with an embodiment of the present invention. The encoder is capable of selectively receiving both input signals of an image A having a screen aspect ratio of 16:9 and an image B having an an aspect ratio of 4:3. First, the case of input of a signal with an aspect ratio of 16:9 is explained, followed by the input of a signal with a aspect ratio of 4:3.

The constituent elements of the embodiment in FIG. 1 include an input terminal 1 for receiving an image A, a blocking device 2 for blocking the input video signal, an orthogonal transformer 3 for orthogonally transforming the blocked signals, a separator 4 for separating the orthogonally transformed blocked signals into blocks of a basic screen (aspect ratio 4:3) and blocks of an additional screen (side panels outside the basic screen), a coding control circuit 5 for determining the coding method so that the sum of the data quantity after coding m blocks of the basic screen and n blocks of the additional screen may not be more than the specified data quantity x, a quantizing coding circuit 6 for quantizing and coding the orthogonal transformation data of m blocks of the basic screen and n blocks of the additional screen by the coding information obtained from the coding control circuit 5 and settling with the data quantity x, and an output terminal 7.

The coding control circuit 5 comprises a data quantity calculator 51 for calculating the data quantity after coding in the unit of m blocks of the basic screen, a data quantity calculator 52 for calculating the data quantity after coding in the unit of n blocks of the additional screen, and a quantizer selector 53 for selecting a quantizer in which the total data quantity may not be more than the data quantity x from the coded data quantity of m blocks of the basic screen obtained from the data quantity calculator 51 and the coding data quantity of n blocks of the additional screen obtained from the data quantity calculator 52. The information of the quantizer selected by the quantizer selector 53 is sent to the quantizing coding circuit 6 as the coding information.

The quantizing coding circuit 6 comprises a quantizer 61 for quantizing the orthogonal transformation data of the basic screen on the basis of the determination by the quantizer selector 53, an encoder 62 for coding the quantized data in variable length, a quantizer 63 for quantizing the orthogonal transformation data of the additional screen, an encoder for coding the quantized data in variable length, and a multiplexer 65 for multiplexing the coded data of the basic screen obtained from the encoder 62 and the coded data of the additional screen obtained from the encoder 64 and sending to the output terminal 7.

The operation of this embodiment is described below.

Figure 2:
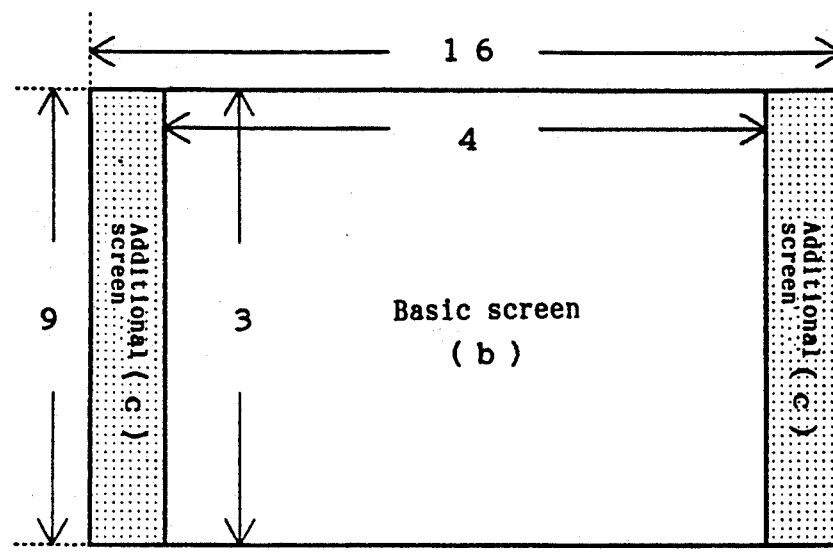
FIGS. 2 and FIGS. 3 are signal composition diagrams of constituent elements for explaining the operation of the same embodiment.
Figure 2:
Figure 2:
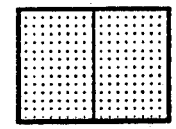
Figure 2:
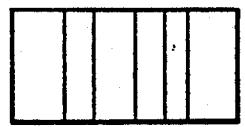
Figure 2:
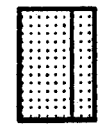
Figure 2:
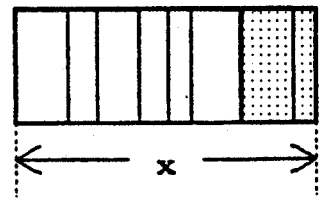

FIG. 2 shows a signal composition diagram of the constituent elements for explaining the operation of the embodiment. Diagram (a) in FIG. 2 denotes the positional relation of the basic screen and additional screen in the image A. The image A with a aspect ratio of 16:9 is divided into the basic screen with a aspect ratio of 4:3 in the central portion thereof, and an additional screen consisting of two regions adjacent to the basic screen disposed in the right and left sides thereof. The blocking device 2 blocks the image A so as not to cross over the data boundary of the basic screen and additional screen in (a), and the orthogonal transformer 3 transforms orthogonally in each block. The separator 4 separates the thus orthogonally transformed block into the basic screen (b) and the additional screen (c).

The coding control circuit 5 takes out m blocks from the basic screen (b) and n blocks from the additional screen (c), and operates so that the total orthogonal transformation data of m+n blocks may be the specific coding data quantity x. As shown in (a), the input data quantity of additional screen is equal to the portion extended in the width from the aspect ratio of 4:3 of basic screen to the aspect ratio of 16:9 of the image A. Therefore the ratio of the input data quantity of the basic screen and additional screen is 3:1. In this embodiment, hence, the number of blocks m taken out from the basic screen is 6, and the number of blocks n taken out from the additional screen is 2 (see (d) and (e) in FIG. 2).

The data quantity calculator 51 preliminarily calculates the coded data quantity when the orthogonal transformation data for the portion of six blocks of the basic screen are quantized by plural quantizers prepared by this encoder and are further coded. Similarly, for two blocks of the additional screen, the coding data quantity is preliminarily calculated by the data quantity calculator 52. The quantizing selector 53 obtains the coding information by selecting the quantizer having the quantizing step width where the coding data quantity for six blocks of the basic screen and two blocks of the additional screen is not more than the specific coding data quantity x, on the basis of the coding data quantity calculated by the data quantity calculators 51, 52.

Next, in the quantizing coding circuit 6, according to the coding information, the quantizer 61 and encoder 62, or the quantizer 63 and encoder 64 respectively quantizes and encodes the orthogonal transformation data of the basic screen and additional screen at the determined quantizing step width. The multiplexer 65 settles the coded data for the portion of six blocks of the basic screen and two blocks for the additional screen, within the frame of the coding data quantity x. At this time, depending on the signal components contained in each block, the data quantity in each block varies usually (for example, as in (f), (g) in FIG. 2). However, since the coded data quantity is preliminarily calculated by the coding control circuit 5, the coded data always settles with the data quantity x as in (h) in FIG. 2. In the multiplexer 65, the coded data of the basic screen and coded data of the additional screen are settled differently. That is, in (h) in FIG. 2, the coded data for six blocks of the basic screen are settled from the left end of the diagram, while the coded data of the additional screen are settled rightward, so that the coded data of the basic screen and additional screen can be distinguished within the data quantity x.

Next, when the image B with the aspect ratio of 4:3 is entered, in the constitution shown in FIG. 1, coding is processed by using only the constituent elements for the basic screen in the image A. That is, the image B is identical in both aspect ratio and data quantity with the basic screen in the image A with the aspect ratio of 16:9, so that the processing for the basic screen may be directly applied. In this case, since nothing is fed into the block for processing of the additional screen, the coded data quantity by the data quantity calculator 52 is always zero, and only the coded data quantity of the data quantity calculator 51 is put out.

Figure 3:
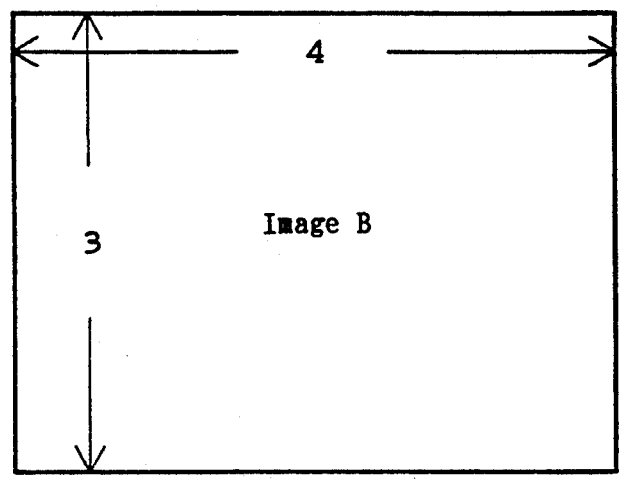
Figure 3:
Figure 3:
Figure 3:
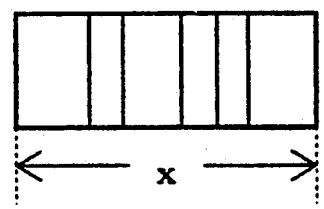

Therefore, as shown in FIG. 3, the quantizer is determined so that the coded data of six blocks of the image B may be not more than the specified data quantity x, and quantizing and coding are executed by the quantizing coding circuit 6 (see FIG. 3).

In this way, the image A with the screen aspect ratio of 4:3 is processed exactly the same as the basic image of the image B with the screen aspect ratio of 16:9, except that the compression rate is higher.

Figure 4:
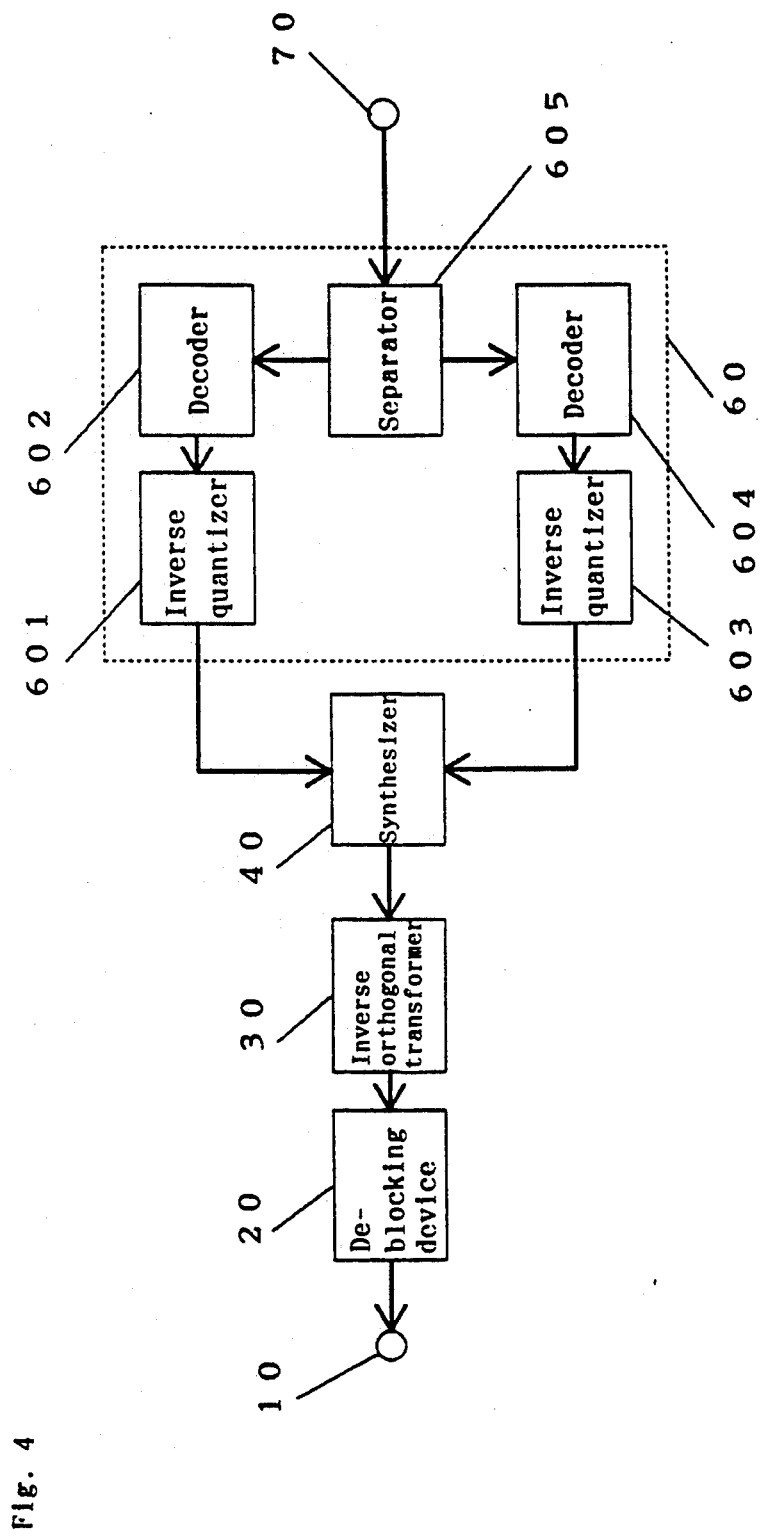
FIG. 4 is a diagram showing a structure of a decoder for returning the data coded by the encoder back to the original image in an embodiment of the invention.

Explained below is the decoding of the data once coded in the above process. FIG. 4 is a block diagram showing the constitution of a decoder, in which the coded data (corresponding to (h) in FIG. 2 or 3) is entered from an input terminal 70 of the decoder. The operation is described below first in the case that the coded data is the image A. Being sent from the input terminal 70 to an inverse quantizing decoding circuit 60, the data is separated in this inverse quantizing decoding circuit 60 into the data of six blocks of the basic screen (corresponding to (f) in FIG. 2) and the data of two blocks of the additional screen (corresponding to (g) in FIG. 2) by a separator 605. The divided six-block data is decoded and inversely quantized (corresponding to (d) in FIG. 2) by a decoder 602 and an inverse quantizer 601, and is output. On the other hand, the two-block data is decoded and inversely quantized (corresponding to (e) in FIG. 2) by a decoder 604 and an inverse quantizer 603, and is output. The two signals from the inverse quantizing decoding circuit 60 are combined by a synthesizer 40 so that the screen may arrange the wide signals at the aspect ratio of 16:9, and are further sent into an inverse orthogonal transformer 30 and an inverse blocking device 20, and put out from an output terminal 10.

If the coded data entering through the input terminal 70 is the coded data of the image B with the screen aspect ratio of 4:3, it is the same as when only the data of six blocks of the basic screen of the image B is entered into the separator 605. There is, hence no data to be processed by the decoder 604 and inverse quantizer 603 in FIG. 4, and they do not operate. Therefore, the video signal obtained from the synthesizer 40 by the inverse orthogonal transformer 30 and inverse blocking device 20 is the image B with the screen aspect ratio of 4:3.

In the decoder, meanwhile, the coded data to be entered through the input terminal 70 is the coded data of the image A with the screen aspect ratio of 16:9, but in the case explained below the video signal outputted from the output terminal 10 is the image B with the screen aspect ratio of 4:3. In the above constitution in FIG. 4, it is very simple, and the data to be processed by the decoder 604 and the inverse quantizer 603 may be set as no-signal. Such 4, function is employed when reproducing on a monitor with a screen aspect ratio of 4:3 in decoding although the input signal when creating the coded data was image A, or when only a monitor having a screen aspect ratio of 4:3 was available in decoding.

Thus, according to the embodiment, the coding processing may be shared by the basic screen with the aspect ratio of 16:9 and the data with the aspect ratio of 4:3, and in both cases the data quantity after coding may be set within the specified data quantity x. Furthermore, by decoding only the data of the basic screen out of the coded data with the aspect ratio of 16:9, it may be produced as the screen with the aspect ratio of 4:3.

Meanwhile, by distinguishing whether the aspect ratio is 16:9 or 4:3 in the data after coding at the time of decoding, in the case of the aspect ratio of 16:9, the information for distinguishing the data of the basic screen and additional screen may be preliminarily multiplexed at the time of coding.

In this embodiment, as the method of high-efficiency coding, the orthogonal transformation is employed, but other coding methods such as predict coding may be equally employed.

What is claimed is:

1. A video signal encoder for selectively receiving an image A with a screen aspect ratio which is larger than 4:3 and an image B with a screen aspect ratio of 4:3, and for blocking and coding a received image by an orthogonal transformation, comprising:

a means for dividing the image A in a basic screen with an aspect ratio of 4.3 corresponding to a central portion of a screen and an additional screen other than the basic screen;

a control means for controlling coding so that a sum of coded data quantity of a specified number of orthogonal transformation blocks of the basic screen and a coded data quantity of another specified number of orthogonal transformation blocks of the additional screen is within a specified data quantity of another specified number of orthogonal transformation blocks of the additional screen is within a specified data quantity when the image A is entered, and for controlling the coding so that a coded data quantity of the same number of orthogonal transformation blocks of the image B as the specified number of the orthogonal transformation blocks of the basic screen of the image A is within the same data quantity as the specified data quantity when the image B is entered; and a coding means for coding orthogonal transformation data of the image A or image B depending on the control means.

2. A video signal encoder according to claim 1, wherein said coding means comprises a first coding means for coding orthogonal transformation data of the basic screen of the image A or the image B depending on the control means, and a second coding means for coding orthogonal transformation data of the additional screen of the image B.

* * * * *

UNITED STATES PATENT AND TRADEMARK OFFICE
CERTIFICATE OF CORRECTION

PATENT NO.   : 5,262,853
DATED        : November 16, 1993
INVENTOR(S)  : Masakazu NISHINO et al It is certified that error appears in the above-indentified patent and that said Letters Patent is hereby corrected as shown below:

Column 6, line 16, delete "of another specified number of orthogonal";

line 17, delete in its entirety;

line 18, delete "within a specified data quantity".

Signed and Sealed this

Twentieth Day of December, 1994

Attest:

BRUCE LEHMAN

Attesting Officer    Commissioner of Patents and Trademarks